(12) United States Patent
Aznar Martinez

(10) Patent No.: US 12,037,186 B2
(45) Date of Patent: Jul. 16, 2024

(54) ELECTRICITY SUPPLY DEVICE FOR THE TRANSPORT OF CONTAINERS SUCH AS REFRIGERATOR CONTAINERS

(71) Applicant: Soluciones Tecnicas Intermodales, S.L., Alicante (ES)

(72) Inventor: Jesús Aznar Martinez, Pozuelo de Alarcón (ES)

(73) Assignee: Soluciones Tecnicas Intermodales, S.L., Alicante (ES)

( * ) Notice: Subject to any disclaimer, the term of this patent is extended or adjusted under 35 U.S.C. 154(b) by 608 days.

(21) Appl. No.: 17/281,390

(22) PCT Filed: Jun. 7, 2019

(86) PCT No.: PCT/ES2019/070397
§ 371 (c)(1),
(2) Date: Mar. 30, 2021

(87) PCT Pub. No.: WO2020/070352
PCT Pub. Date: Apr. 9, 2020

(65) Prior Publication Data
US 2022/0033178 A1 Feb. 3, 2022

(30) Foreign Application Priority Data
Oct. 1, 2018 (WO) ................ PCT/ES2018/070631

(51) Int. Cl.
*B65D 90/00* (2006.01)
(52) U.S. Cl.
CPC .. *B65D 90/0013* (2013.01); *B65D 2590/0016* (2013.01)

(58) Field of Classification Search
None
See application file for complete search history.

(56) References Cited

U.S. PATENT DOCUMENTS

| | | | |
|---|---|---|---|
| 3,078,115 A | 2/1963 | Harlander et al. | |
| 3,872,555 A | 3/1975 | Link et al. | |
| 5,137,115 A | 8/1992 | Arnold | |
| 6,877,939 B2 * | 4/2005 | Tomkins | B65D 90/0013 410/82 |
| 10,807,837 B2 * | 10/2020 | Beer | B66C 13/08 |
| 11,124,391 B2 * | 9/2021 | Clive-Smith | B66C 1/663 |

(Continued)

FOREIGN PATENT DOCUMENTS

| | | |
|---|---|---|
| CN | 203865315 U | 8/2014 |
| CN | 106476818 A | 3/2017 |

(Continued)

*Primary Examiner* — Courtney L Smith
(74) *Attorney, Agent, or Firm* — Richard M. Goldberg

(57) ABSTRACT

A device includes a structure adapted to be coupled to the roof of a container, and which includes a main cabling that passes through the device between the front and rear ends thereof and which allows two or more devices to be connected together; and secondary cabling, with at least one connection terminal, which is connected to the main cabling and is used to supply electricity to at least the container on which same is situated; and an arm for securing/releasing twistlock securing elements by a mechanical system, the ends of the arms being provided with terminals for connecting the main cabling.

17 Claims, 7 Drawing Sheets

(56) References Cited

U.S. PATENT DOCUMENTS

| | | | |
|---|---|---|---|
| 2012/0306223 A1* | 12/2012 | Karlsson | B66C 1/102 |
| | | | 294/81.62 |
| 2013/0056991 A1 | 3/2013 | Petersen et al. | |
| 2014/0238467 A1 | 8/2014 | Martin et al. | |
| 2020/0354198 A1* | 11/2020 | Clive-Smith | B66C 1/663 |

FOREIGN PATENT DOCUMENTS

| | | |
|---|---|---|
| DE | 102017112608 A1 | 12/2018 |
| EP | 3205604 A1 | 8/2017 |
| EP | 3246193 A1 | 11/2017 |
| ES | 1195038 U | 10/2017 |
| KR | 20120014820 A | 2/2012 |
| WO | 2018053603 A1 | 3/2018 |
| WO | 2018150153 A1 | 8/2018 |

* cited by examiner

ELECTRICITY SUPPLY DEVICE FOR THE TRANSPORT OF CONTAINERS SUCH AS REFRIGERATOR CONTAINERS

BACKGROUND OF THE INVENTION

The present invention belongs to the technical field of transporting goods in containers, and particularly transporting goods at a controlled temperature, where the containers transporting said goods require electricity.

The invention consists of a device which constitutes an electricity supply device, which is provided in the corners thereof with a twistlock-type connecting device that allows it to be permanently or temporarily secured to a standardized container and temporarily secured to a handling device, such as a dock crane, and with an extendable electrical connection which allows said device to be connected to an external energy source and/or allows two or more devices to be connected to one another.

STATE OF THE ART

A container is a cargo vessel for the transport by sea, inland waterway, land and intermodal transport in which different types of transport are used, with said containers being standardized in different dimensions. Among such containers, the most common are 20, 40 and 45-foot containers. The containers are leak-tight units which protect the goods against the weather, and although their size and shape vary depending on the desired length and height, their shape and characteristics are regulated according to ISO standards, which facilitates the handling and adaptation thereof to the decks of ships and cargo spaces in trucks and railway trains.

There are certain products, especially foodstuffs or raw materials from the food and chemical or chemical-pharmaceutical sectors, such as fruits, vegetables, dairy products, meats, etc., that are temperature-sensitive, i.e., which may spoil or have properties that may be jeopardized by a significant variation in temperature, so the temperature at which these products are transported must be regulated. On a number of occasions, these products must be transported through intermodal networks from their inland origin to a port of loading and from ports of discharge to their inland destination, so intermodal refrigerated containers equipped with a refrigerator motor that allows goods of this type to be transported are used to transport these products. Nevertheless, although these containers are equipped with a motor, they depend on an external energy source.

Different connections are arranged in the ships and in terminals for supplying electricity for containers of this type. However, the distance at which the container is situated is not always suitable for supplying electricity. A problem which generates enormous limitations is in railway transport. Only some railway operators have developed convoys with electrified cars for transporting these refrigerated containers, and when a customer needs a train for the refrigerated transport he has to commit to using a certain number of units or the entire train, or he has to invest in cabling for all the cars, as well as for the generating set, in some cases doubled, supplying power to the refrigerator containers.

Document CN106476818 describes a system for supplying electricity in which the car comprises a device for supplying electricity connected to the refrigeration equipment of the container. This invention does not solve the problem considered above, since the transport operator must have cars of this type.

Document CN203865315 describes a solar energy refrigerated container, wherein a solar panel, a refrigerator, a temperature controller and a fan are arranged and are electronically connected, respectively, to a storage battery. The reliance on a weak and irregular power source has its obvious drawbacks, since a continuous supply of electricity to the refrigeration device cannot be guaranteed, with the risk of the temperature increasing, which deteriorates or jeopardizes the transported product.

US 2013056991 describes a power supply unit for ISO containers including photovoltaic solar panels which produce electricity, allowing the standardized assembly and securing of ISO containers. The invention allows the containers to be stacked during transport, but it does not allow being used for railway transport. The invention does not describe the manner of actuating the system for securing to the corresponding container.

Other documents, such as US 2014238467, describe devices for autonomously supplying electricity for containers, and this document in particular describes a portable solar energy generation system that has a disassembled configuration and an assembled configuration. The system includes a solar energy generation assembly and a portable container. The system may further include an internal frame, a power inverter, a charge controller, batteries, attachment components, wires, user input devices, fluid tank, turbine, pump, generator and other system components. When in the disassembled configuration, all system components including the solar energy generation assembly are packaged within the portable container. When in the disassembled configuration, the solar energy generation assembly is coupled to an external surface of the container and is either generating electricity within the container or redirecting sunlight for electricity generation at a predetermined target. This device is not provided with a standardized securing system for securing with the container, it cannot be used as a system for supplying electricity for railway transport, it is dependent on external conditions (light, temperature conditions), and furthermore the power provided by the solar panels may be insufficient for guaranteeing the supply of electricity of the container for maintaining the required temperatures for the required time.

Document ES 1195038U describes a device which is based on a structure coupled to the roof of a container and comprises: a main cable that passes through the device between the front and rear ends thereof and which allows two or more devices to be connected together; and a secondary cable, with at least one connection terminal, which is connected to the main cable and is used to supply electricity to at least the container on which same is situated. The problem with said device is that the connection and disconnection between the devices is difficult for an operator if the devices are installed over the containers.

The present invention presents a device which allows electricity to be supplied to usually standardized containers, providing energy during all the phases of transport regardless of the means of transport being used, and furthermore allowing multiple refrigerated containers situated in proximity, such as, for example, in a railway convoy, to be connected to a single generating set without the need for any type of additional cabling in the cars thereof. The device also includes elements so that an operator can conveniently perform the connection between different devices from the floor.

Summary of the Invention

ISO containers (which are manufactured according to standard ISO-668) comprise a standardized mechanism (twistlock) for securing containers during transport to a base or to another container, as well as to facilitate handling them when they are lifted with overhead cranes, gantry cranes, etc. The corners of standardized containers consist of a corner casting inserted on each of the vertexes of the container and without any movable component which has approximately oval-shaped holes. The twistlock is inserted into the opening and rotated 90 degrees to lock it and it cannot be removed until it is rotated again. The twistlock can be fixed if it is inserted in the cranes and at the bases of transport vehicles, or movable if, for example, it is used for attaching several containers to one another.

The present invention provides a device conceived for being arranged on the roof of a container, and it only modifies the geometry of same in height. The device of the invention is based on a generally metal structure coupled to the roof of the container by means of twistlock securing pins which are inserted in the corner castings of the container, which may be integrated in the structure of the electricity supply device. The structure further comprises standardized corner castings in upper positions which allow being handled by means of any machine of those commonly used in ports and intermodal terminals which have standardized twistlock securing pins.

The geometry of the device will preferably be formed by two parallel longitudinal beams, with a transverse beam arranged at each of the ends thereof. The longitudinal beams may be attached to one another by means of attachment braces, and the attachments between the longitudinal and transverse beams may be provided with stiffening corner castings. The beams will generally be hollow tubes with a square section.

According to a preferred embodiment option, at least at one of the ends of the device, and more preferably at both ends, usually in an area close to one of the ends of the corresponding transverse beam, there is situated a tubular support which prolongs the length of the device. In the application for 45-foot containers, this tubular support will have a length of at least between 2.5 and 3 feet, such that the end of said tubular support projects from the length of a 45-foot container when the device is placed on said container.

Between the tubular support and the corresponding transverse beam there is arranged a support platform for the electrical elements, such as connection boxes, protective elements, regulators, etc.

The structure will therefore be the same for a 40-foot or 45-foot container, unlike the length of the tubular support, of the shaft of the arm, and of the position of the platform, which in devices for 40-foot containers will be situated in any position between the outer transverse beams.

A rotating shaft exits the transverse beam, through the tubular support, if there is one, which shaft is attached at one of the ends thereof to an actuating lever. The actuating lever will act on the twistlock securing elements of the device in the container. Optionally, it may also act on a connection/disconnection device of the electrical system.

According to the most common embodiment, only the twistlock securing elements for the attachment with the container will be actuated.

Furthermore, the rotating shaft is attached to at least one first connecting rod connecting to a first twistlock and a second connecting rod connecting to a second twistlock. Said connecting rods are articulated a certain distance from the geometric axes of the rotating shaft and of the corresponding twistlock. The rotation of the rotating shaft will cause the longitudinal shift of the connecting rods, and accordingly the rotation of the twistlock. Optionally, additional connecting rods may be arranged in diametrically opposed positions both in the rotating shaft and in the twistlocks, such that when one of the connecting rods pulls, the additional connecting rod pushes, and vice versa. The connecting rods of both sides, which connect the rotating shaft to both twistlocks, present opposing movements, such that when the connecting rod of one side pushes, the connecting rod of the other side pulls, and vice versa. The two twistlocks of each outer transverse beam can be linked to one another by means of a single attachment bar, such that the actuation of the arm on the bar simultaneously actuates both twistlocks. Furthermore, a mechanical attachment is also provided between the shafts of the arms of both front and rear ends of the device, such that upon actuating that of one end, that of the other end is also simultaneously actuated, the four twistlocks thereby being actuated simultaneously. For example, actuation can be performed by means of a connecting rod-crank mechanism, such as that described for each twistlock, or by means of a gear system.

The device twistlock is also envisaged to be provided with a small window, such that it shows one color in a given angular position and another color in another angular position. The colors red and green have particularly been envisaged, such that one of the colors indicates that the device is arranged and secured in the container and the other color indicates that the device is free and can be detached from the container. Particularly, the colors are painted on the curved surface of the twistlock and, depending on the angular position, one color or the other is shown in the small window.

According to one though less preferred option, the small window may also be provided with a telltale light electrically connected to the electrical system of the device, such that when it is active there is an illuminated indicator, and when it is inactive there is no illumination.

The tubular support and the actuating lever are provided with the electrical connection elements between each pair of devices; in particular, the electrical connector is arranged in an area close to the end of the actuating lever, such that they may only be connected when the twistlocks are secured to the container and the ends of the levers below.

In one option, the ends of the front and rear levers are arranged on opposite sides, such that the minimum distance between the end of the lever of a front device and the end of the lever of a rear device shall be achieved when both levers are dropped downwards. Nevertheless, insofar as the height at which the levers are situated in the release position is greater than two meters, an operator may only carry out the connection comfortably when both levers are dropped downwards, in the securing position.

It is envisaged that the levers may be provided with a gripping element, such as for example a handle provided with a cable, to facilitate handling same without the operator having to reach the maximum height.

It is also envisaged that the arm is provided with a damping device, such that when the arm is made to descend from the free position to the securing position, it does so gently and without any risk for the operators; in a limiting manner, the damping device can be a pneumatic or hydraulic piston, a reduction gear, a spring or a combination of any of the foregoing.

Therefore, both the structure of the device alone and the device-container assembly (once secured) can be handled with the machinery commonly used for moving containers. In addition to facilitating handling, the arrangement of the corner castings and the twistlock securing pins allow the device to be interchangeable and enable them to be used with any ISO container with the same dimensions.

The device of the invention is not limited to any particular dimensions, although it will usually be made for 20, 40 and 45-foot containers, which are the standard containers most often used.

The structure of the device internally comprises the following elements:

A first cabling or main cabling that passes through said device between the front and rear ends thereof and which allows two or more of said devices to be connected together; the cabling extends from the end of the front arm to the end of the rear arm, and usually runs through the interior of the beams, such that it is protected against any external aggression and prevents interference with other elements when the device is handled;

A second cabling or secondary cabling, with at least one connection terminal, which is connected to the main cabling and is used to supply electricity at least to the container on which same is situated; the secondary cabling will usually be connected in a connection box situated on the aforementioned support platform;

According to other options, the following may also be arranged:
  At least one first device for winding or taking up the main cabling, which allows maintaining the mechanical tension of the cable between the different devices connected to one another, or with a primary source of electricity, such as a generating set
  Possibly a second device for taking up or winding the secondary cabling;
  Possibly a voltage converter or regulator which modifies and/or stabilizes the voltage to be received by the container from the generating set or from the batteries.

BRIEF DESCRIPTION OF THE DRAWINGS

With the aim of illustrating the explanation below, seven pages of drawings are attached to the present specification, in which nine figures represent, by way of example and not limitation, the essence of the present invention according to a particular embodiment, and in which the following may be seen.

The following reference signs can be seen in the figures:
  10 container
  11 upper corner castings of the container
  20 structure of the device
  21 upper corner castings of the device
  22 main cabling
  22*a* first connector of the main cabling
  22*b* second connector of the main cabling
  23 secondary cabling
  23*a* connector of the secondary cabling
  24 take-up device
  25 voltage regulator or converter
  26 battery
  30 longitudinal beams
  31 transverse bracing bars
  32 outer beams
  33 twistlock pins of the device
  34 arm
  35 shaft
  36 spacer
  37 position marker
  38 adjustable cable fastener
  40 body for actuating the shaft of the arm;
  41 connecting rod for actuating the twistlock
  42 articulation of the connecting rod on the shaft 35 for actuating the twistlock
  43 articulation of the connecting rod on the twistlock
  44 tubular support
  45 Support platform

DESCRIPTION OF THE PREFERRED EMBODIMENTS OF THE INVENTION

In light of the aforementioned figures, and in accordance with the adopted numbering, one may observe therein an exemplary embodiment of the invention, which comprises the parts and elements indicated and described in detail below.

Figure 1:
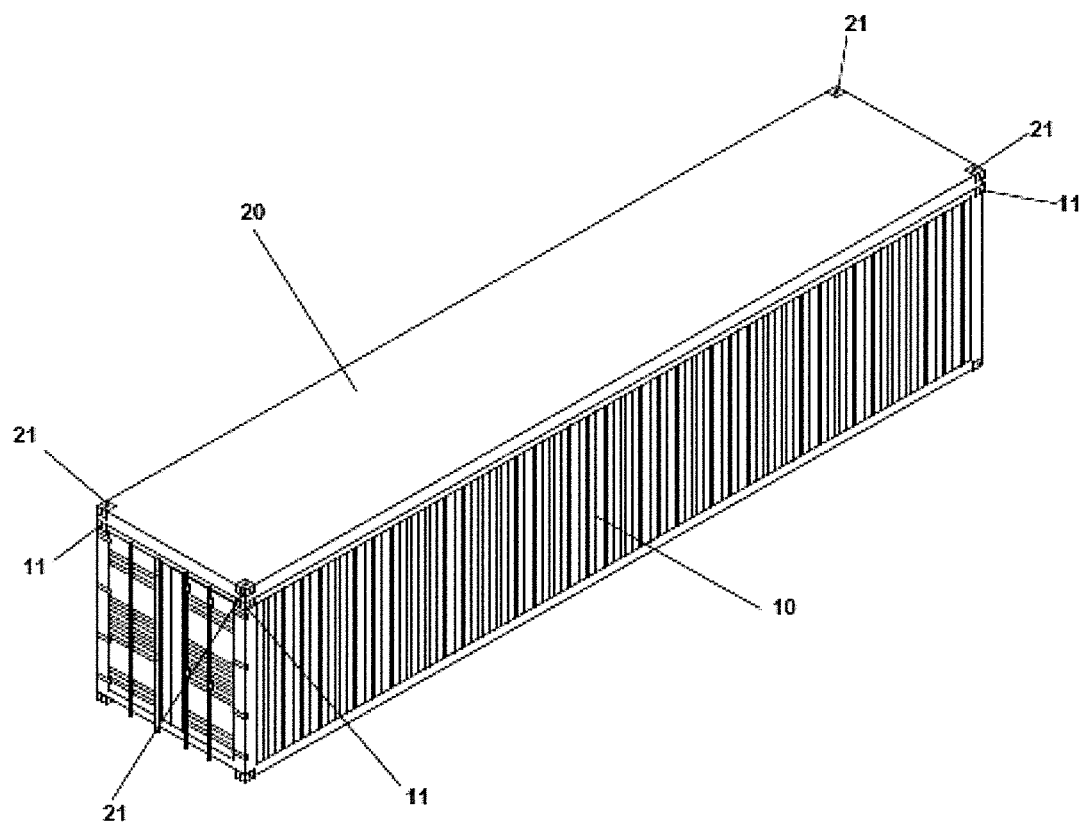
FIG. 1 shows a perspective view of the structure of the electricity supply device of the invention assembled on a container for goods.

Therefore, as can be observed in FIG. 1, the device of the invention is based on a usually metal structure (20), of a height of less than 35 cm and preferably less than 20 cm, and horizontal dimensions usually equal to those of the container in which it is situated (since 45-foot containers have a double twistlock securing anchor, the structure (20) envisaged for 40-foot containers may be used, such that the ends of the device will be located a certain distance from the ends of the container), conceived to be arranged on a container (10), such as a refrigerated container, and once arranged on the container, the assembly differs from the geometry of the container (10) only in height. The structure (20) is provided with twistlock pins (33) in the lower part thereof, by means of which the device is coupled to the roof of the container, being inserted in the four upper corner castings (11) of the container (10), and which allow the container and device to form a single body. Said structure may also be provided with upper corner castings (21), when required due to the height of the device, for holding and handling the assembly (formed by container and device), for example by means of cranes, reach stacker-type forklifts, or any other apparatus for handling containers.

The twistlock pins (33) are integrated in the structure (20) and have an automatic opening and closing mechanism for when the structure (20) is positioned on the roof of the container (10). It can also be observed how four corner castings (21) are arranged in the upper corners of the structure (20) for handling same with machinery usually found in ports and intermodal terminals for arranging the structure (20) on the container (10), and for handling the assembly once the structure (20) has been secured to the container (10).

Figure 2:
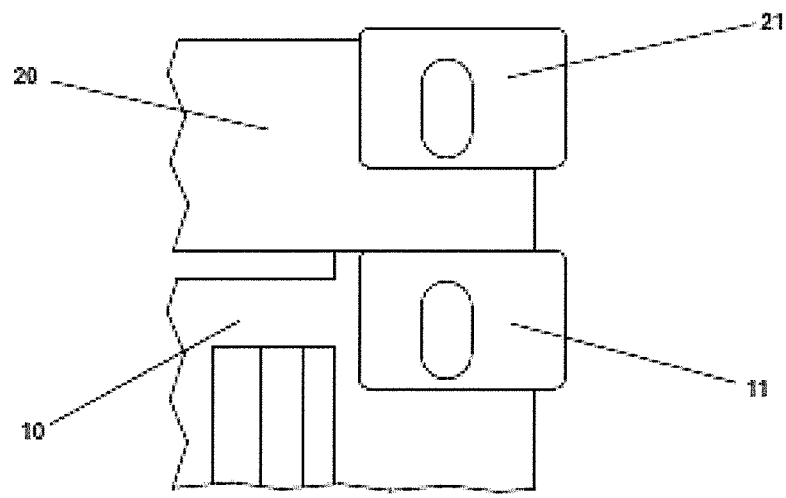
FIG. 2 shows a detail of the attachment by means of a twistlock between the structure of the electricity supply device and the container for goods.

The detail of the attachment of the structure (20) with the container (10) can be observed in FIG. 2.

Figure 3:
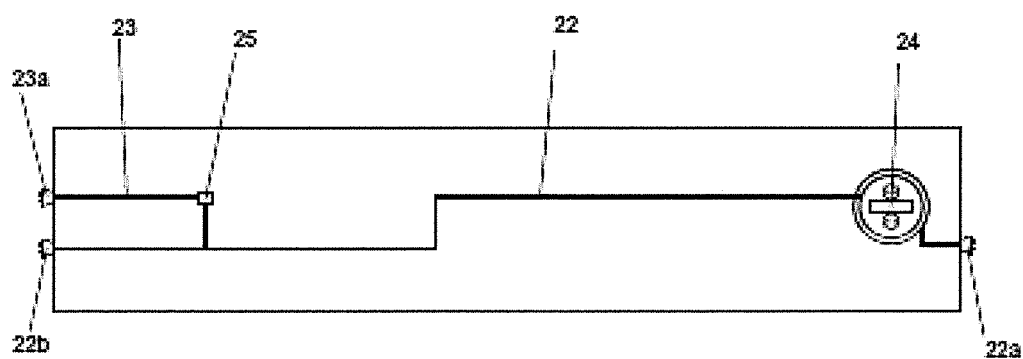
FIG. 3 shows a schematic view which shows the different components forming part of the electricity supply device of the invention.

The basic configuration of the elements forming the electricity supply device for transport in containers of the invention can be seen schematically in FIG. 3. The device thus comprises at least one main cabling (22) attaching both front and rear ends of the device, which allows several units of the device to be connected in series. This first cabling (22) comprises a first connector (22a) at one end and a second connector (22b) at the other end; these first and second connectors determine the power inlet and outlet connections. This main cabling (22) comprises a take-up device, such as a winding or take-up device (24) equipped with elastic recovery means, usually close to the first connector (22a) or to the second connector (22b) which, in addition to allowing the lengthening thereof to make the connection, maintains the necessary tension to minimize the length extracted for the connection due to the elastic means thereof. The first connector (22a) of the device attached to a first container is connected to the second connector (22b) of the device attached to a second connector, and so on and so forth. At least one of the connectors at one of the ends is connected with the primary source of electricity. In the event that the primary source of electricity is a generator, it can be arranged in a central car (in the case of transport by railway) and therefore supply electricity both towards the front and towards the back.

From the main cabling (22), there is at least one shunt of a secondary cabling (23), with at least one connector (23a), by means of which electricity is supplied to the electrical equipment, usually refrigeration equipment. In said secondary cabling (23), there is preferably arranged a voltage regulator or converter (25) which modifies and/or stabilizes the voltage supplied, in the case of the embodiment of FIG. 1, through the primary source of electricity (not shown in the figures). The connections and protection devices will usually be situated in connection boxes arranged on a support platform (45).

Figure 4:
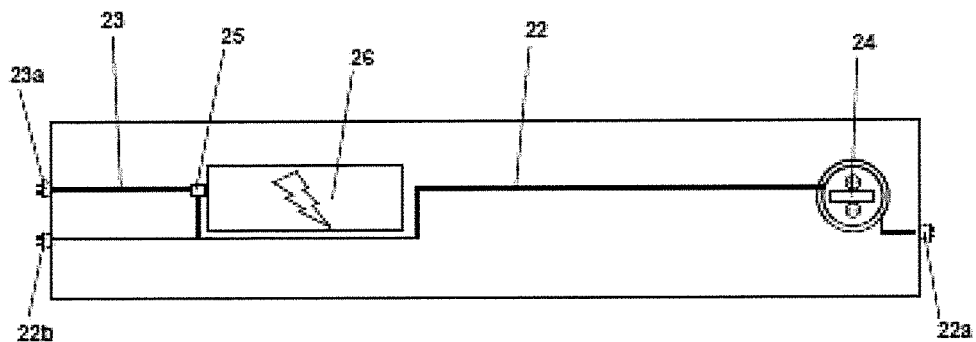
FIG. 4 shows a schematic view of the electricity supply device which shows, in accordance with an optional embodiment, the components shown in FIG. 3 to which there has been added an electrical accumulation system by means of batteries.

The refrigerated containers are very well insulated. However, it is necessary to gradually recover the setpoint temperature to compensate for the heat that is outwardly transmitted. Depending on the required temperature and on environmental conditions, the operating cycles of the cooling system will be shorter or longer and will occur every more or less time. However, recovery of the thermal conditions is essential for products such as frozen goods, which, when the cold chain is broken, may be rendered useless or it may adversely affect the duration thereof in conditions of use. When breakdowns occur, for example, because the catenary breaks, the product will be in the container for a prolonged period of time and the thermal level inside the container must be maintained. For that purpose, as an optional element, it has been envisaged that the device of the invention is optionally provided with a battery or electric accumulator (26), as seen in FIG. 4, which will usually be arranged in a support inside the structure; in a particularly but non-limiting manner, the power supplied by these batteries must be between 2 k W and 7 kW, and it must be capable of supplying electric current for one to six hours, depending on the temperature to be maintained inside the container. This guarantees electricity is supplied to the cooling system, even in the event of an external electricity supply element breaking down, or in any case where electricity must be supplied on the journey during intermediate steps in intermodal transport.

It is envisaged that the system for releasing or taking up the cables can be carried out by means of an automatic system, in which when the device is to be connected, the operator already has the cable released, and vice versa, such that upon disconnecting the corresponding connections, the cables can be automatically taken up, which entails considerable savings in the handling cost in terminals, as well as an increase in safety for the personnel in charge of handling the connections.

It is also envisaged, as an option, that the device may constitute a temperature control and communication unit which can send data about the temperature curves and consumption to the customer or user of said container.

Once the use has ended, the devices of the invention can be stacked by means of twistlocks up to a specific height and be handled like a container.

It is envisaged that the twistlock securing pins (33) for securing the structure (20) on the container (10) have automatic opening and closing mechanisms.

Figure 5:
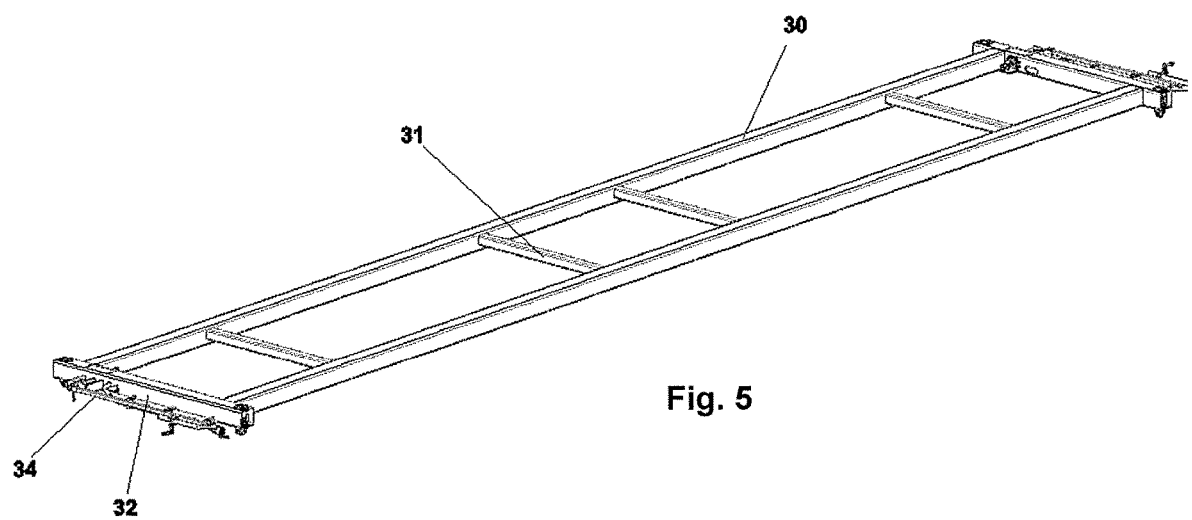
FIG. 5 shows a perspective view of the electricity supply device, according to an embodiment of the present invention, according to an embodiment envisaged for 20 or 40-foot containers.
Figure 6:
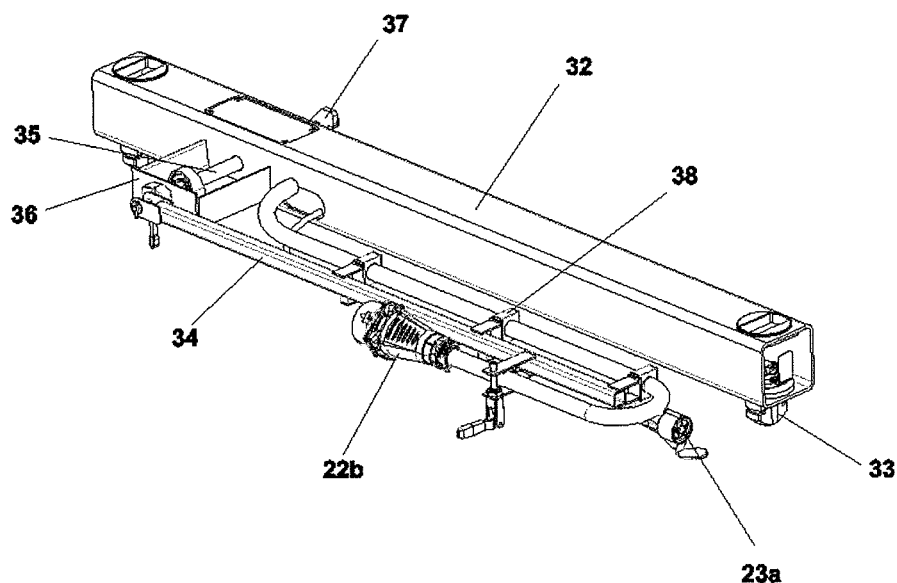
FIG. 6 shows the release position of the electricity supply device with respect to the (non-depicted) container of FIG. 5.
Figure 7:
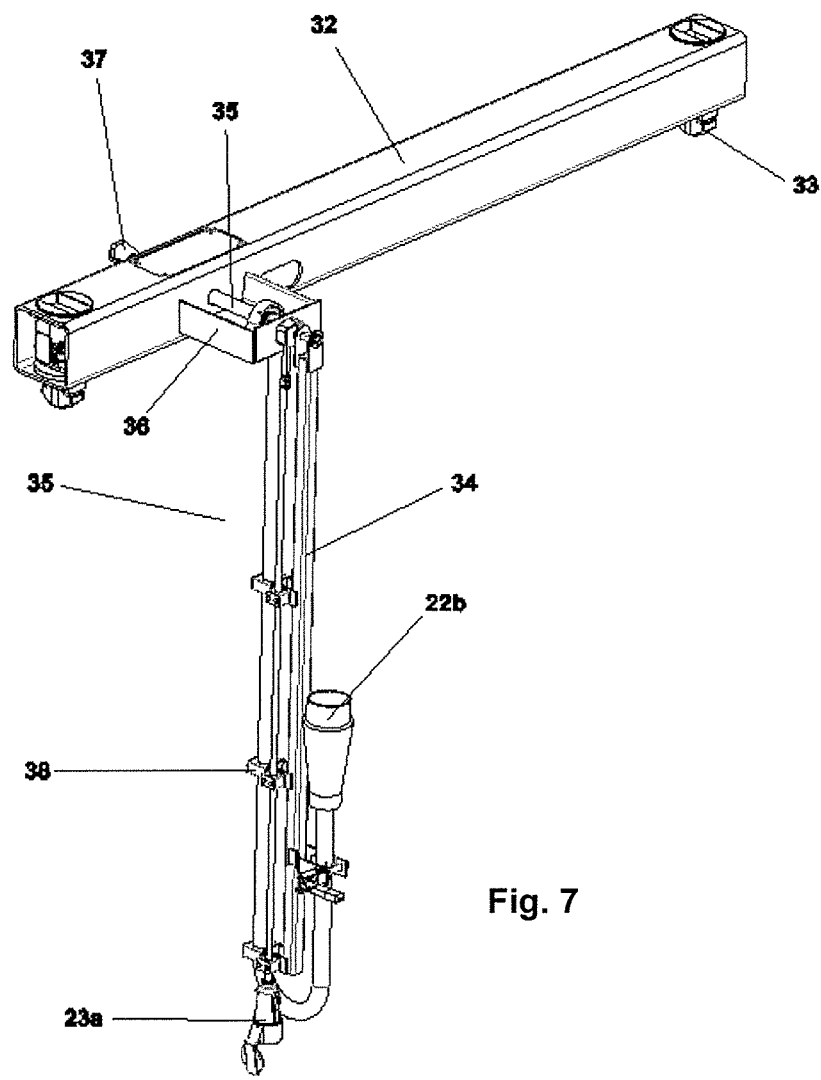
FIG. 7 shows a securing position of the electricity supply device in the (non-depicted) container of FIG. 5.

An alternative embodiment of the present invention can be observed in FIGS. 5, 6 and 7. In said embodiment, the structure is formed by a pair of longitudinal beams (30) arranged in parallel which are attached by an assembly of transverse bars (31) arranged perpendicularly between them. At least one of the longitudinal beams (30) is hollow, and the main cabling (22) runs through the interior thereof. In turn, the bars transverse (31) can be profiles of any type.

The ends of the longitudinal beams (30) are attached to respective outer beams (32). Lower twistlock pins (33) and mechanisms for handling by means of machinery for transporting containers are located at the ends of said outer beams (32).

Figure 8:
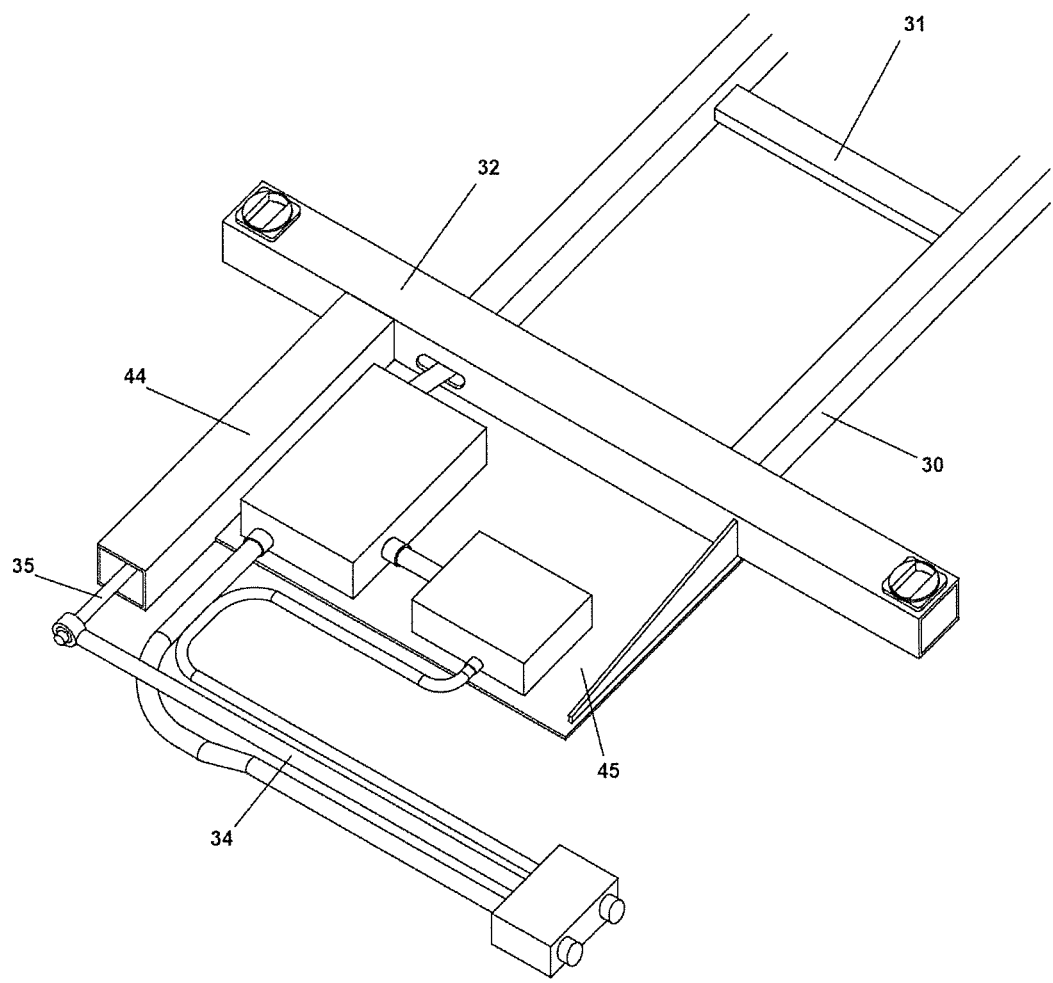
FIG. 8 shows a schematic perspective view of the actuation mechanism of the twistlock of one of the sides of the device by means of the actuating lever, in an embodiment envisaged for 45-foot containers.

In each outer beam (32), there is arranged an arm (34) articulated with respect to said outer beam (32), such that the arm (34) has two positions, a first horizontal position parallel to the outer beam (32), as shown in FIG. 7, in which the twistlock is free, and another second vertical position perpendicular to said outer beam (32), as shown in FIG. 8, in which the twistlock is secured to the container.

The arm (34) is attached at the end thereof to a shaft (35), with the arm and the shaft being perpendicular to one another. The shaft (35) is arranged in the outer beam (32) perpendicular to same, and the function thereof is to support the arm (34). Optionally, the end of the shaft (35) farthest away from the outer beam (32) and attached to the arm (34) is arranged on a spacer (36) in turn attached to the outer beam (32) to prevent the bending produced by the weight of the arm from producing deformations in said shaft (35).

On one of the outer arms, the arm is used as a support both for the section of the main cabling (22) and for the section of the secondary cabling (23) coming out of the outer beam (32) of the structure (20), the corresponding second connector of the main cabling (22b) and connector of the secondary cabling (23a) being arranged at the ends of the main cabling and the secondary cabling supported by the arm (34). The cables are attached to the arm (34) by means of an assembly of adjustable cable fasteners (38), which can be secured in different positions along the arm (34). On the outer arm (32) of the opposite end of the structure, the arm is used as a support for the section of the main cabling (23) comprising at the end thereof the first connector of the main cabling (23*a*).

Figure 9:
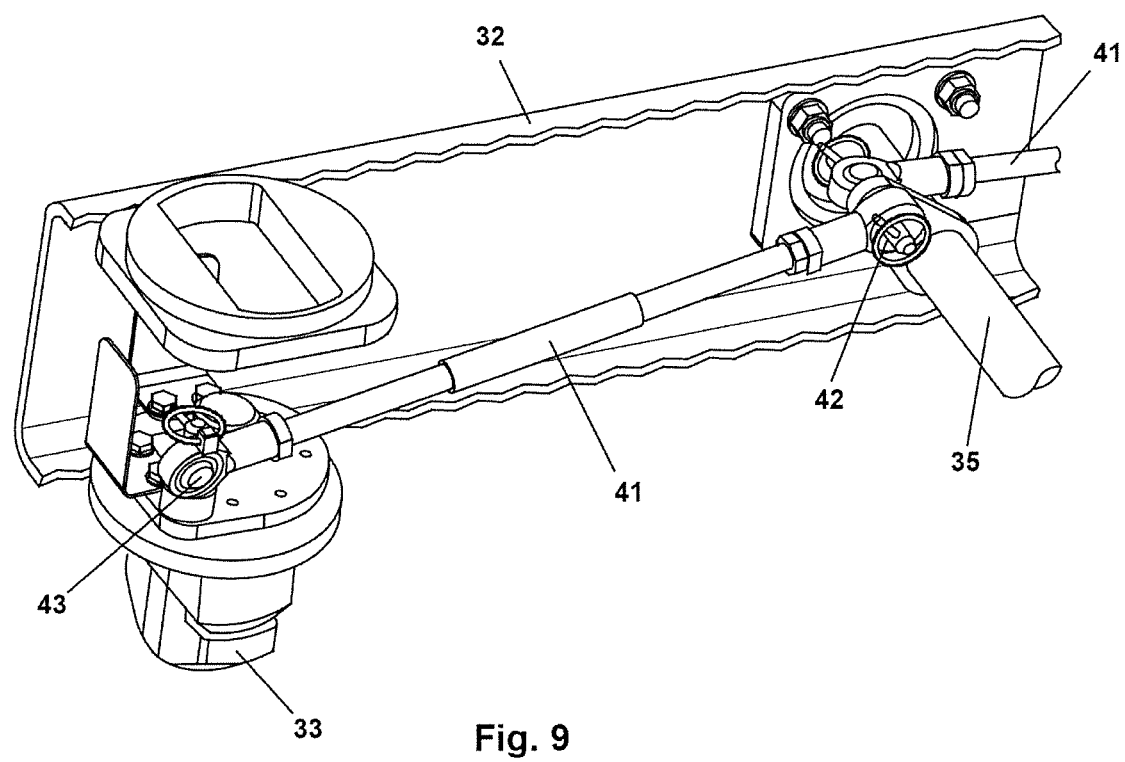
FIG. 9 shows a schematic perspective view of a detail of the actuation mechanism on the twistlock, in which the outer beam has been cut away.

According to an embodiment option shown in FIGS. 8 and 9, a tubular support (44) which prolongs the length of the device is situated at the two ends of the device. The shaft (35) exits the transverse beam (32), through the tubular support (44), if there is one, which shaft is attached at one of the ends thereof to the arm (34). The shaft (35) of the arm (34) has an articulation element (42) for connecting rods (41) for actuating the twistlock (33), arranged a certain distance from the geometric axis of the shaft (35). When the arm (34) is lowered from a position vertical to a position horizontal, or vice versa, the shaft (35) is rotated, and with that rotation the articulation (42) is shifted angularly, such that said point of articulation moves away from or closer to the vertical shafts of the twistlocks arranged at each of the ends of the corresponding outer beam.

Since the articulated connecting rod is also an articulation (43) on the body of the twistlock (33), also a certain distance from the geometric axis thereof, the longitudinal shift of the connecting rod (41) will cause the rotation of the twistlock in a direction of rotation corresponding with the shift of the connecting rod. The lowering of the arm (34) in the opposite direction will also cause the rotation of the shaft (35) in the opposite direction, the corresponding shift of the connecting rods, and the also opposite rotation of the twistlocks.

According to an embodiment option, the shaft (35) comprises, preferably at the end opposite the end where the arm (34) is attached, a position marker (37) showing the position of the arm and therefore the securing status on the container, which thus allows knowing the status of the switch without needing to see the arm itself.

What is claimed is:

1. An electricity supply device for transport containers such as refrigerator containers, comprising a structure adapted to be arranged on one said container, the structure comprising:
    twistlock securing elements in a lower part thereof adapted to be secured and inserted into upper corner castings of the one said container; and
    a main cabling attaching a front end to a rear end of the device, the main cabling comprising:
        a first connector at one of the ends; and
        a second connector at the other of the ends;
        wherein said main cabling allows said electricity supply device to be connected in series with at least one other electricity supply device, and said electricity supply device to be connected to an electrical energy supply source;
    a secondary cabling connected to the main cabling by which electricity is supplied to electrical equipment of the one said container via a connector of said secondary cabling;
    an articulated arm arranged on each of smaller front and rear sides of the structure, wherein the main cabling and the secondary cabling are attached to the arm in such a manner that the arm is movable between two positions, including a first position parallel and horizontal to the structure, and a second position perpendicular and vertical to the structure, in which in one of the positions of the arm, the twistlock securing elements are secured to the one said container, and in the other one of the positions the twistlock securing elements are free.

2. The electricity supply device for the transport of containers such as refrigerator containers according to claim 1,
    wherein the structure is comprised of two longitudinal beams arranged in parallel attached by an assembly of transverse beams in turn arranged perpendicular to said longitudinal beams, and
    wherein the main cabling runs through an interior of at least one of the longitudinal beams.

3. The electricity supply device for the transport of containers such as refrigerator containers according to claim 1, wherein
    the articulated arm includes a shaft,
    said shaft includes at least one articulation of an end of at least one connecting rod for actuating at least one said twistlock securing element, and
    the at least one twistlock securing element includes at least one articulation of another one of the ends of the at least one connecting rod, such that rotation of the shaft by actuation of the articulated arm causes a shift of the point of articulation with the connecting rod and a corresponding longitudinal shift of said connecting rod, and a corresponding rotation of the at least one said twistlock securing element.

4. The electricity supply device for the transport of containers such as refrigerator containers according to claim 1, wherein horizontal dimensions of the structure are equal to horizontal dimensions of the one said container on which it is to be secured.

5. The electricity supply device for the transport of containers such as refrigerator containers according to claim 3, wherein the structure for 45-foot containers is common to that developed for 40-foot containers, with the exception of the length of the shaft of the arm.

6. The electricity supply device for the transport of containers such as refrigerator containers according to claim 1, further comprising a voltage converter for modifying and stabilizing the voltage received by the one said container.

7. The electricity supply device for the transport of containers such as refrigerator containers according to claim 1, further comprising a support for a battery and a battery arranged in said support, connected to the electrical system.

8. The electricity supply device for the transport of containers such as refrigerator containers according to claim 1, further comprising a stacking arrangement with identical devices, and in that a twistlock securing element is arranged between every two devices.

9. The electricity supply device for the transport of containers such as refrigerator containers according to claim 1, further comprising longitudinal bars attached at ends thereof by respective outer bars, with ends of said outer bars having twistlock pins in a lower part thereof, and mechanisms for handling the same by container transport machinery.

10. The electricity supply device for the transport of containers such as refrigerator containers according to claim 9, wherein the articulated arm is attached at an end thereof to a shaft, with the arm and the shaft being perpendicular to one another, and with the shaft being arranged in one said outer bar perpendicular to same.

11. The electricity supply device for the transport of containers such as refrigerator containers according to claim 10, wherein an end of the shaft farthest away from the outer bar and attached to the articulated arm is arranged on a spacer which, in turn, is attached to the outer bar.

12. The electricity supply device for the transport of containers such as refrigerator containers according to claim 10, wherein the shaft comprises a position marker showing the position of the arm.

13. The electricity supply device for the transport of containers such as refrigerator containers according to claim 1, wherein the main cabling and the secondary cabling are attached to the arm by an assembly of adjustable cable fasteners which are adapted to be secured in different positions along said articulated arm.

14. The electricity supply device for the transport of containers such as refrigerator containers according to claim 1, wherein the structure has a height of less than 35 cm.

15. The electricity supply device for the transport of containers such as refrigerator containers according to claim 14, wherein the structure has a height of less than 20 cm.

16. The electricity supply device for the transport of containers such as refrigerator containers according to claim 3, wherein:
- the structure includes at least at one of the ends with a tubular support for prolonging the length of the device; and
- said tubular support houses the shaft of the actuating lever.

17. The electricity supply device for the transport of containers such as refrigerator containers according to claim 1, further comprising a mechanical attachment arranged for simultaneously actuating the twistlock securing elements of at the front and rear ends of the device.

* * * * *